United States Patent [19]

Tuholski

[11] Patent Number: 5,429,204
[45] Date of Patent: Jul. 4, 1995

[54] SYSTEM FOR CONVERTING FOUR WHEEL DRIVE VEHICLE TO ALLOW FREEWHEELING OF REAR WHEELS

[76] Inventor: Jerome P. Tuholski, P.O. Box 8009, Central Valley, Calif. 96019

[21] Appl. No.: 264,893

[22] Filed: Jun. 24, 1994

[51] Int. Cl.6 .............................................. B60B 27/00
[52] U.S. Cl. ...................... 180/247; 29/401.1; 192/67 R; 403/1
[58] Field of Search ................ 180/233, 247, 248; 403/1; 192/36, 67 B; 29/401.1

[56] References Cited

U.S. PATENT DOCUMENTS

| | | |
|---|---|---|
| 2,525,695 | 10/1950 | Lombard . |
| 4,089,610 | 5/1978 | Kleespies et al. ............... 403/1 |
| 4,304,317 | 12/1981 | Vanzant et al. ............... 180/247 |
| 4,334,590 | 6/1982 | Plumb ............................ 180/247 |
| 4,610,558 | 9/1986 | Erickson ...................... 192/67 R |
| 4,625,846 | 12/1986 | Gomez ........................... 180/247 |
| 4,706,517 | 11/1987 | Garrett . |
| 4,788,888 | 12/1988 | Tsutsumikoshi . |
| 4,817,752 | 4/1989 | Lobo et al. .................... 180/247 |
| 4,856,633 | 8/1989 | Specht ......................... 192/67 R |
| 5,105,517 | 4/1992 | Barnow . |

OTHER PUBLICATIONS

*Motor's Auto Repair Manual*, published by Motor of New York, New York, 1966, p. 1009.

*Primary Examiner*—Mitchell J. Hill
*Attorney, Agent, or Firm*—Thomas R. Lampe

[57] ABSTRACT

An apparatus and a method for converting a four wheel drive motor vehicle having a non-freewheeling rear axle assembly to a vehicle having rear axle freewheeling capability. The rear axle shafts of the vehicle are replaced with other axle shafts having splined inner and outer shaft ends. The rear hubs are replaced with freewheeling replacement hubs and locking hubs are installed over the splined outer shaft ends of the replacement shafts and adjacent to the freewheeling replacement hubs.

2 Claims, 3 Drawing Sheets

1

SYSTEM FOR CONVERTING FOUR WHEEL DRIVE VEHICLE TO ALLOW FREEWHEELING OF REAR WHEELS

TECHNICAL FIELD

Certain four wheel drive vehicles, for example the 4×4 CJ Series Jeep vehicle, are so constructed as to not allow "freewheeling" of the rear wheels thereof. Such capability is desirable on certain occasions, an example being when the vehicle is being towed. A towed vehicle not having rear freewheeling capability will be subjected to undesirable wear due to rotation of the axles operatively associated with the rear wheels.

As will be shown in detail below, the present invention relates to both an apparatus for and a method of converting a four wheel drive vehicle having a non-freewheeling rear axle assembly to a vehicle having rear axle freewheeling capability.

BACKGROUND ART

A search of the prior art located a number of patents directed to conversion systems for modifying the operation of motor vehicles, including the operation of the transmission thereof. However, none of the located prior art patents is directed to the conversion approach generally described above for converting a vehicle to freewheeling capability.

Applicant is aware of the following U.S. patents which are believed to be exemplary of the prior art: U.S. Pat. No. 4,304,317, issued Dec. 8, 1981, U.S. Pat. No. 4,706,517, issued Nov. 17, 1987, U.S. Pat. No. 5,105,517, issued Apr. 21, 1992, U.S. Pat. No. 2,525,695, issued Oct. 10, 1950, U.S. Pat. No. 4,334,590, issued Jun. 15, 1982, U.S. Pat. No. 4,817 752, issued Apr. 4, 1989, U.S. Pat. No. 4,788,888, issued Dec. 6, 1988 and U.S. Pat. No. 4,625,846, issued Dec. 2, 1986.

DISCLOSURE OF INVENTION

The method of the present invention is for the purpose of converting a four wheel drive motor vehicle having a non-freewheeling rear axle assembly to a vehicle having rear axle freewheeling capability. The non-freewheeling rear axle assembly conventionally found on CJ Series Jeep vehicles, for example, includes a rear axle housing having opposed rear axle housing ends, rear axle shafts located within the rear axle housing and projecting from the housing ends having splined inner shaft ends and non-splined outer shaft ends and a rear hub disposed over each rear axle shaft at the non-splined outer shaft end thereof with the non-splined outer shaft ends projecting through and outwardly from their respective rear hubs and fixedly secured thereto by mechanical fasteners.

The method includes the step of unsecuring the rear hubs from their respective non-splined outer shaft ends.

The rear hubs are removed from their respective non-splined outer shaft ends.

The rear axle shafts are removed from the rear axle housing.

The rear axle shafts are then replaced with replacement axle shafts having splined inner shaft ends and splined outer shaft ends, the splined inner shaft ends of the replacement shafts being positioned in the rear axle housing with the splined outer shaft ends of the replacement shafts projecting outwardly from the housing ends.

The rear hubs are replaced with freewheeling replacement hubs by inserting each replacement shaft into a freewheeling replacement hub.

Locking hubs are installed over the splined outer shaft ends of the replacement shafts and adjacent to the freewheeling replacement hubs, the locking hubs being independently adjustable to selectively lock their respective replacement hubs and their respective replacement shafts against relative movement or alternatively allow ready rotational movement of their respective hubs relative to their respective replacement shafts.

The present invention also encompasses conversion kit apparatus for converting a four wheel drive motor vehicle having a non-freewheeling rear axle assembly to a vehicle having rear axle freewheeling capability.

The conversion kit apparatus includes replacement axle shafts for replacing the rear axle shafts, the replacement axle shafts having splined inner shaft ends and splined outer shaft ends.

The conversion kit apparatus also includes freewheeling replacement hubs for replacing the rear hubs and for insertion over the replacement shafts.

Locking hubs are provided for installation over the splined outer shaft ends of the replacement shafts and adjacent to the freewheeling replacement hubs, the locking hubs upon installation thereof being independently adjustable to selectively either lock their respective replacement hubs and replacement shafts against relative movement or alternatively allow ready rotational movement of their respective replacement hubs relative to their respective replacement shafts.

Other features, advantages, and objects of the present invention will become apparent with reference to the following description and accompanying drawings.

BEST MODE FOR CARRYING OUT THE INVENTION

Figure 1:
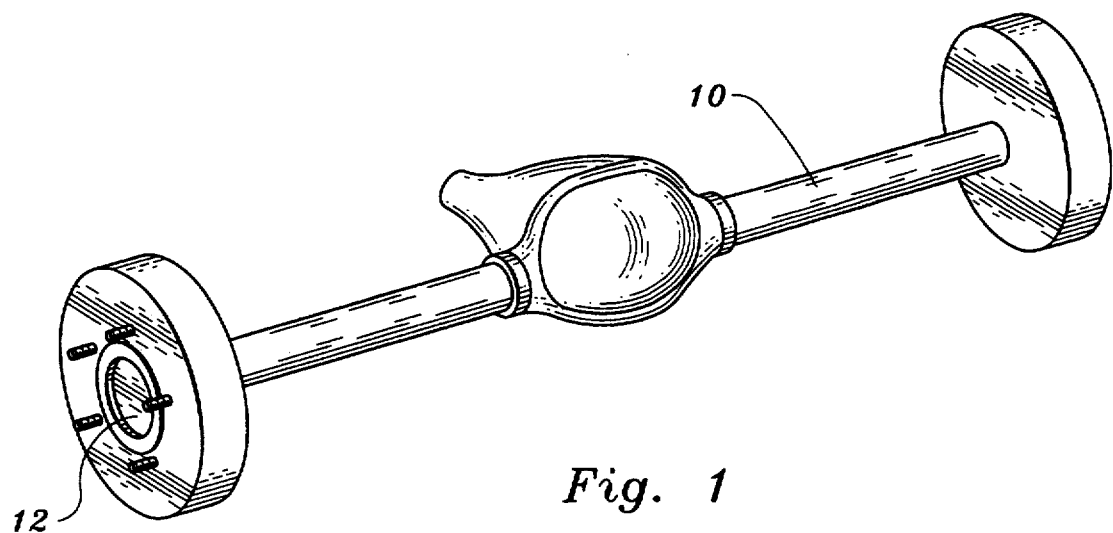
FIG. 1 is a perspective view of a conventional non-freewheeling rear axle assembly of a vehicle.
Figure 2:
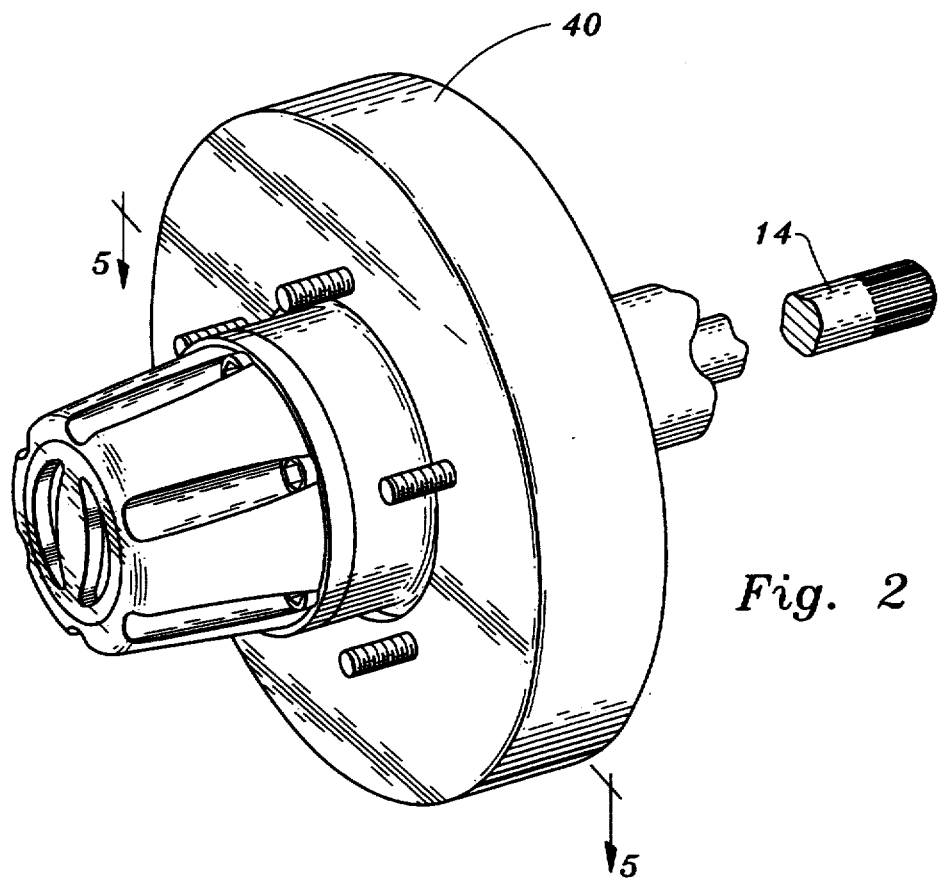
FIG. 2 is an enlarged perspective view of a locking hub and related structure at the end of an axle after vehicle conversion in accordance with the teachings of the present invention.
Figure 3:
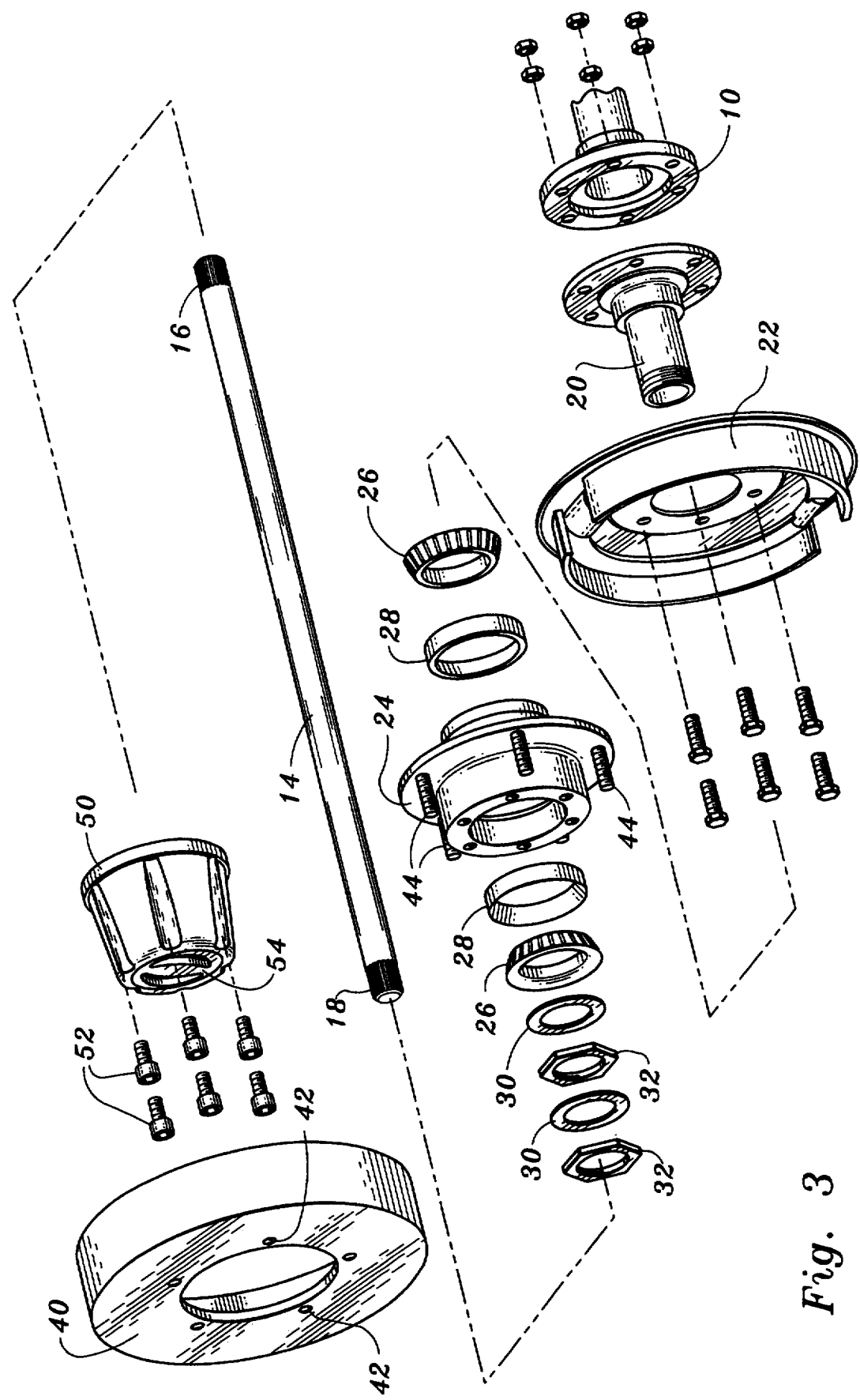
FIG. 3 is an exploded perspective view of structural elements employed in the conversion.
Figure 4:
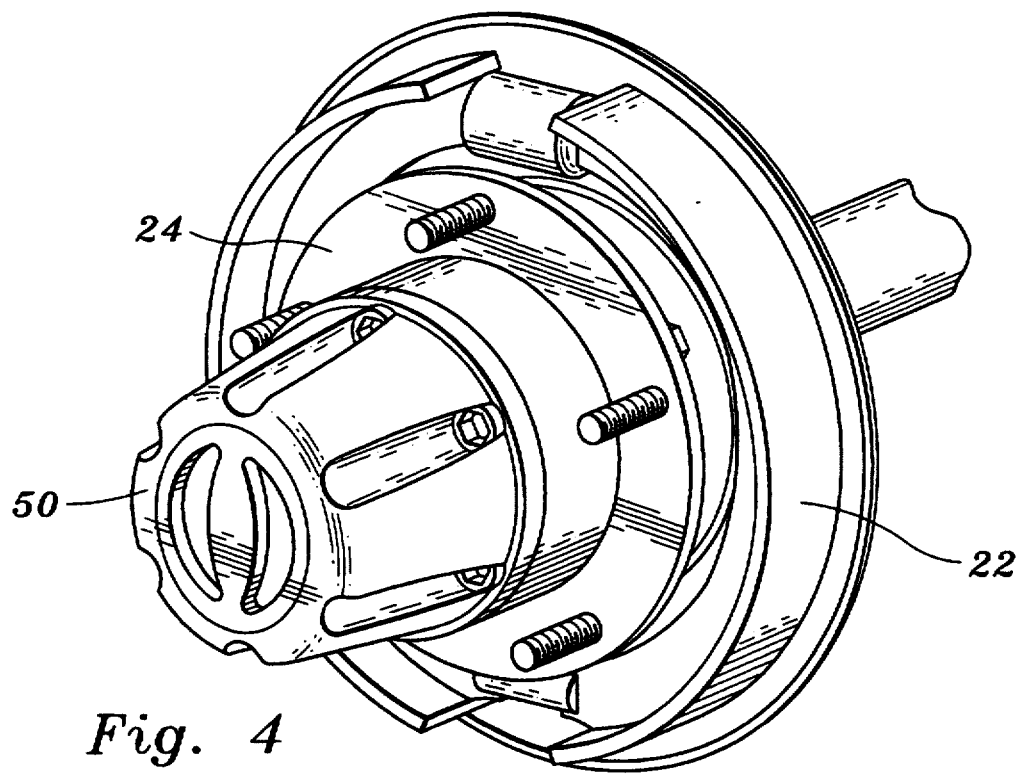
FIG. 4 is a perspective view similar to FIG. 2 but without the brake drum.
Figure 5:
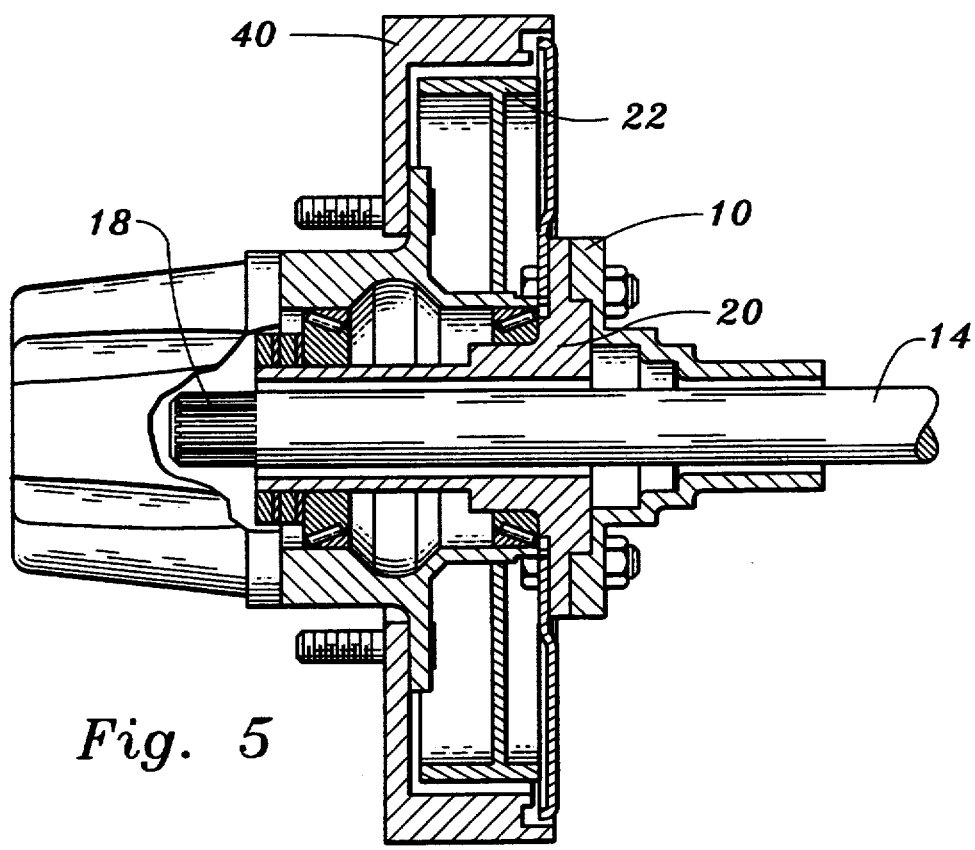
FIG. 5 is a sectional view taken along the line 5—5 in FIG. 2.

FIG. 1 illustrates the non-freewheeling rear axle assembly of a four wheel drive motor vehicle. In particular, the assembly illustrated is of the type employed on a 4×4 CJ Series "Jeep" ® vehicle.

The assembly includes a rear axle housing 10 having opposed rear axle housing ends. Rear axle shafts (not shown) are located within the rear axle housing and project from the housing ends. The rear axle shafts conventionally provided with the 4×4 CJ Series "Jeep" ® vehicle have splined inner shaft ends and non-splined outer shaft ends. A rear hub 12 is disposed over each rear axle shaft at the non-splined outer shaft end thereof with the non-splined outer shaft ends projecting through and outwardly from their respective rear hubs and fixedly secured thereto by mechanical fasteners.

In the interest of simplicity, such structure has not been illustrated; however, virtually, any mechanic's manual relating to the 4×4 CJ Series "Jeep" ® vehicle can be referred to for details of such construction. For example, such structure is shown on page 1009 of *Motor's Auto Repair Manual* (1966) published by "Motor" of New York, N.Y. Converting the above-described commercially available non-freewheeling rear axle assembly to a vehicle having rear axle freewheeling capability is the object of the present invention and such conversion is readily and efficiently accomplished through utilization of the method and apparatus of the present invention.

According to the method of the present invention, rear hubs 12 are unsecured from the non-splined outer shaft ends of their respective shafts. Rear hubs 12 are removed from their respective non-splined outer shaft ends. The rear axle shafts are removed from the rear axle housing 10.

The removed rear axle shafts are replaced by replacement axle shafts 14 having splined inner shaft ends 16 and splined outer shaft ends 18. In the interest of simplicity only one replacement axle shaft 14 is shown in the drawings; however, it will be appreciated that a second replacement axle shaft 14 is to be disposed at the other end of housing 10. Likewise, the structural elements operatively associated with the illustrated replacement axle shaft 14 as described below are the same with respect to the replacement axle shaft 14 not illustrated and which is disposed at the other housing end.

The conversion kit of the present invention also includes a spindle 20 secured to each rear axle housing end by nuts and bolts which also extend through a conventional brake assembly 22.

A freewheeling hub 24 is positioned over spindle 20. For example in the case of the 4×4 CJ Series "Jeep" ® vehicle, the hub 24 may be of the type employed in operative association with the front axle of such vehicle. Involved in the assembly of hub 24 are the conventional associated structural elements employed with wheel hubs generally such as bearings 26, seals 28, washers 30, and lock nuts 32. A brake drum 40 is secured over the brake assembly 22. Apertures 42 in the brake drum 40 receive threaded stub shafts 44 on hub 24.

Finally, a mechanical locking hub 50 is secured by threaded fasteners 52 to hub 24. Since mechanical locking hubs are of well known construction, details thereof are not illustrated in the drawings. Suitable locking hubs are for example Warn 4WD hubs made available by Warn Industries, Inc. of Milwaukie, Oreg. Suffice it to say that the mechanical locking hub includes a control knob 54 which may be manually adjusted to selectively either lock replacement hub 24 and the replacement shaft 14 over which the mechanical locking hub is positioned against relative movement or alternatively allow for ready relative rotational movement of the replacement hub 24 about shaft 14.

I claim:

1. A method of converting a four wheel drive motor vehicle having a non-freewheeling rear axle assembly to a vehicle having rear axle freewheeling capability, said non-freewheeling rear axle assembly including a rear axle housing defining a rear axle housing interior and having opposed rear axle housing ends, each said rear axle housing end defining an axle housing opening communicating with said rear axle housing interior, rear axle shafts located within said rear axle housing interior and projecting from the openings defined by said rear axle housing ends having splined inner shaft ends and non-splined outer shaft ends, a rear hub disposed over each rear axle shaft at the non-splined outer shaft end thereof with the non-splined outer shaft ends projecting through and outwardly from their respective rear hubs and fixedly secured thereto by mechanical fasteners, said method comprising the steps of:

unsecuring said rear hubs from their respective non-splined outer shaft ends;

removing said rear hubs from their respective non-splined outer shaft ends;

removing said rear axle shafts from said rear axle housing;

fixedly securing a spindle having a spindle interior to said rear axle housing at each rear axle housing end with the interiors of said fixedly secured spindles in communication with said rear axle housing interior through said axle housing openings;

replacing said rear axle shafts with replacement axle shafts having splined inner shaft ends and splined outer shaft ends, the splined inner shaft ends of said replacement shafts being extended through the interiors of said fixedly secured spindles, through said axle housing openings and into said rear axle housing interior with the splined outer shaft ends of said replacement shafts projecting outwardly from said rear axle housing ends and outwardly from said fixedly secured spindles;

replacing said rear hubs with freewheeling replacement hubs by rotatably mounting said free wheeling replacement hubs on said fixedly secured spindles and by inserting each replacement shaft into and through a freewheeling replacement hub with the splined outer shaft end of each replacement shaft projecting beyond a freewheeling replacement hub; and installing locking hubs over the splined outer shaft ends of said replacement shafts outwardly of and adjacent to said freewheeling replacement hubs, said locking hubs being independently adjustable to selectively either lock their respective replacement hubs and replacement shafts against relative movement or alternatively allow ready rotational movement of their respective replacement hubs relative to their respective replacement shafts, said locking hubs being connected to said fixedly secured spindles by threadingly engaging said locking hubs with said fixedly secured spindles.

2. Conversion kit apparatus for converting a four wheel drive motor vehicle having a non-freewheeling rear axle assembly to a vehicle having rear axle freewheeling capability, said non-freewheeling rear axle assembly including a rear axle housing defining a rear axle housing interior and having opposed rear axle housing ends, each said rear axle housing end defining an axle housing opening communicating with said rear axle housing interior, rear axle shafts located within said rear axle housing interior and projecting from the openings defined by said housing ends having splined inner shaft ends and non-splined outer shaft ends, a rear hub disposed over each rear axle shaft at the non-splined outer shaft end thereof with the non-splined outer shaft ends projecting through and outwardly from their respective rear hubs and fixedly secured thereto by mechanical fasteners, said conversion kit apparatus including:

spindles having interiors for fixed securement to said rear axle housing at each rear axle housing end with the interiors of said fixedly secured spindles in communication with said rear axle housing interior through said axle housing openings, said spindles having threaded distal ends;

replacement axle shafts for replacing said rear axle shafts, said replacement axle shafts having splined inner shaft ends and splined outer shaft ends and being of a length sufficient for extending beyond the threaded distal ends of said spindles upon replacement of said rear axle shafts;

freewheeling replacement hubs for replacing said rear hubs and for insertion over said replacement shafts and over said spindles after said spindles have been fixedly secured to said rear axle housing; and mechanical locking hubs for installation over the splined outer shaft ends of said replacement shafts outwardly of and adjacent to said freewheeling replacement hubs and for threaded engagement with the threaded distal ends of said spindles, said locking hubs upon installation thereof being independently adjustable to selectively either lock their respective replacement hubs and replacement shafts against relative movement or alternatively allow ready rotational movement of their respective replacement hubs relative to their respective replacement shafts.

* * * * *